United States Patent Office 2,784,118
Patented Mar. 5, 1957

2,784,118

CARAMEL COLOR MANUFACTURE

Ronald E. Pyle and Joseph B. Longenecker, Granite City, Ill., assignors to Union Starch & Refining Company, Columbus, Ind., a corporation of Indiana No Drawing. Application May 16, 1955,
Serial No. 508,786

3 Claims. (Cl. 127—34)

This invention relates to a novel caramel color (sugar color, burnt sugar coloring, etc.) and the process for the production of such caramel color. More particularly this invention relates to caramel color which can be used as burnt sugar flavors and foaming agents, as well as coloring agents, and the processes necessary for obtaining these properties.

Among the objects of this invention is to provide a commercially practical method of producing caramel color from hydrolysis products of starch that will provide a product of high burnt sugar flavor and foaming properties.

In various processes hitherto employed for producing caramel colors by heating corn sugar in the absence of catalytic materials, it has been impossible to obtain a caramel color of high tinctorial power, because the sugar melt becomes too thick and too viscous for practical handling of materials. It is extremely difficult to incorporate dilution water into the viscous mass.

One phase of this invention is based on the discovery that if corn sugar is first modified by a mild treatment with alkali and heat, followed by neutralization with acid, then the caramelization process can be carried to a high degree of color intensity without encountering the difficulties of thickening and extremely high viscosity. Water can be easily incorporated into the product to obtain free-flowing liquids of any desired Baumé which can be easily handled.

It is accordingly an object of this invention to overcome the difficulties of producing caramel color of high coloring power by simple heat treatment of corn sugars.

This process can be applied for making caramel colors which are to be used as flavoring agents to impart the burnt sugar flavor or as foaming agents. Normally caramel colors are used primarily as coloring agents and are of high tinctorial power. Catalysts are used in the processing of these caramel colors in order to accelerate the rate of color formation. By the use of such catalysts, a high degree of color intensity can be obtained without encountering such difficulties as thickness or high viscosity of the sugar mass. However, the use of small amounts of catalysts modifies the taste of the final product and products of mild flavor are obtained. Therefore, caramel colors produced by the use of catalytic agents are not adaptable to uses which require burnt sugar flavor as well as coloring properties.

There is a definite need for caramel color products capable of producing a rich brown color as well as a burnt sugar or caramel flavor in the products to which they are added. The normal and acid proof type of caramel colors ordinarily produce a gray brown color in the products to which they are added whereas a rich brown color or a brown containing more of the red component is frequently desirable.

It is therefore another object of this invention to overcome this deficiency and to produce a caramel color that will impart a burnt sugar flavor as well as a burnt sugar color to the ultimate product in which it is used.

It is a further object of this invention to produce a caramel color which will impart foaming properties to the ultimate product in which it is used.

The process set forth herein accomplished the above objectives in a most satisfactory manner and to a degree providing very desirable properties in respect to burnt sugar flavor, foaming tendencies, and moderate or high coloring power. The caramel color is markedly superior to the caramel colors that can be made by heating untreated corn sugars in the absence of catalysts. The caramel color produced is markedly superior to caramel colors produced by the use of catalysts with respect to burnt sugar flavor properties and with respect to the richness of the color produced.

The above cited results are accomplished generally by pretreating the carbohydrate to be caramelized in order to effect a reaction before the main caramelization of the material is affected. The pretreatment is carried out by controlled heating in the presence of one or more alkaline reagents. Before the caramelization step the syrup is brought back to a pH of 2–5.

With a corn syrup having a content of 60–100% reducing sugars 0.1–5% of an alkaline reagent, such as sodium hydroxide or potassium hydroxide is added and the resulting syrup is heated at 150–250° F., for one-fourth to two hours. This treatment does not necessarily decrease the D. E. or reducing sugar content as measured by the Lane and Eynon method, but does cause a decrease in the specific rotation of the sugars.

The alkaline pretreatment causes a chemical reaction of the nature of an isomerization reaction which is manifested by a pronounced diminution in the specific rotation of the sugars. This isomerization reaction was first noted by Lobry de Bruyn and Alberda von Ekenstein in 1895. When dextrose solutions are treated with alkalies, the optical rotation of these solutions is decreased, and from the products of the reaction, dextrose, mannose, and fructose can be isolated. Kusin in 1936 has shown that fructose, but not mannose, was formed when dextrose solutions were treated with dilute sodium hydroxide solutions at room temperature. The extent of treatment can be controlled readily by checking the specific rotation of the sugar being treated.

The alkaline agent added may be any alkaline material having distinct alkaline properties such as the hydroxides of the alkali or alkaline earth metals or the alkali metal salts of weak acids such as sodium carbonate, etc.

This alkaline pretreatment in concentrated solution transforms the carbohydrates into materials which can be more readily caramelized by heating in the absence of catalysts. Sufficient fructose appears to be formed during the pretreatment to produce a caramel color which has a distinct burnt sugar taste similar to that obtained by burning cane sugar.

A neutralizing agent (preferably hydrochloric acid) is then added to the alkaline treated sugar liquor to bring the pH down to a value between 2.0–5.0, or preferably 2.7–3.5.

On completion of the second preliminary step the digestion liquor is then heated to a temperature within the range of 275° to 380° F. and held there until the desired caramelization is achieved or the desired tinctorial power is obtained. The concentration of carbohydrate in the solution must obviously be sufficient to attain the desired caramelizing temperatures although the syrups can be heated in an autoclave at pressures above atmospheric if desired. With corn syrups it is best to start with a solution of 30 to 45° Bé.

The solution may be burnt to produce a tinctorial power (T. P.) of 2 to 30 depending on the balance desired between flavor and color. The products of low T. P. are useful as a flavoring agent in light colored food products such as cakes, cookies, candies, breakfast cereals, etc., wherein a burnt sugar flavor is desired. The higher T. P. products are useful in dark cakes, gravy aids and similar foods where a richer brown color is desired. It has been found according to the invention that the flavor strength and color strength of the product are not directly related. The color values or T. P. increases faster than flavor after a certain flavor level is reached. It is, therefore, feasible to obtain a desirable flavor product with a T. P. as low as 2. For example, an 18 T. P. product which has about 4.5 to 5 times the color of a 3.5 to 4 T. P. product has only about 2.5 to 3 times the caramel flavor of such product.

In cases where the flavor is the primary consideration limiting values for some of the treatments in the process some of the treatments in the process are somewhat more restricted as is shown by the following table.

TABLE

|  | Overall Limits | Limits for flavor characteristics | Limits for color characteristics |
| --- | --- | --- | --- |
| Reducing sugar content | 60–100 | 60–100% | 60–100. |
| Alkali Concentrate | 0.1–5% | 0.1 to 5% | 0.1 to 5%. |
| Alkali treatment time | ½ to 2 hours | ½ to 2 hours | ½ to 2 hours. |
| Alkali treatment temp | 150°–250° F | 150°–250° F | 150°–250° F. |
| pH at start of burning | 2–5 | 2.7–3.5 | 2–5. |
| Burning Temperature | 275–380° F | 275°–310° F | 310–380° F. |
| Tinctorial Power (T. P.) | 2–30 | 2–9 | 15–30. |
| Adjustment of final pH | 2–7 | 2–7 | 2–7. |

The final color is fixed by cooling rapidly to approximately 150° F. by circulation of cooling water through the jacket of the reaction vessel and by adding relatively cool water which also serves the additional function of adjusting the final concentration that is desired.

The examples below describe caramel colors and the process of making the same according to the present invention but the same process may be employed with other water-soluble carbohydrates such as reducing sugars, hydrolysis products of all commercial starches, such as from corn, tapioca, rice, sage, wheat and sweet potatoes. However, the process is especially suitable for the manufacture of caramel color materials from the hydrolysis products of corn starch commonly known as corn sugars. The latter are usually designated as "70" or "80" sugars in commerce because they contain approximately 70 or 80% of reducing sugars, calculated as dextrose. Pure dextrose sugar may, of course, be used as formed by hydrolysis of the above starches. Unusual results are noted with dextrose and corn sugar syrups in that caramel products having flavor characteristics heretofore obtainable only from sucrose or invert sugars may be manufactured by this process.

Hydrolysis products of starches which contain lower amounts of reducing sugars than the proportions found in the commercial corn sugars may be utilized by this process. Partially exhausted mother liquors from which a portion of the dextrose has been crystallized, such as first greens or hydrol, will serve to make caramel color by the process here related.

*Example I*

To 45° Bé. corn sugar of approximately 80 D. E. having a pH of 4.5 is added enough 30% sodium hydroxide to give a concentration of 0.5%. The syrup is heated at approximately 200° F. for 15–30 minutes. Then sufficient 50% sulfuric acid is added to adjust the pH to 3.0.

The pretreated sugar liquor is heated to 350° F. and held at this temperature until the desired tinctorial power is attained. The time required for burning or caramelization is approximately one hour. When caramelization is completed the digestion mass is diluted with approximately 35% by volume of water, to provide a solution having a tinctorial power of 15–20 Lovibond units. The solution has foaming properties substantially equivalent of that of normal foaming caramel color and has a distinct burnt sugar flavor.

*Example II*

To 45° Bé. corn sugar of approximately 80 D. E., having a pH of 4.5, is added enough 30% sodium hydroxide to give a concentration of 0.25%. The syrup is heated at approximately 200° F. for 15 minutes. Then sufficient 50% sulfuric acid is added to adjust the pH to 3.2–3.5.

The pretreated sugar is heated to 300–305° F. and is held at this temperature until the desired tinctorial power is attained. The time required for the reaction is approximately 2½ hours. When caramelization is completed the digestion mass is diluted with approximately 35% by volume of water, to provide a solution having a tinctorial power of 4–6 Lovibond units. The solution has a pleasant burnt sugar flavor and can be used in products requiring this flavor.

This application is a continuation-in-part of U. S. application Serial No. 280,198, filed April 2, 1952, now abandoned.

It will be seen that this invention provides a novel method of making caramel color materials with a burnt sugar taste and with no undesirable tastes due to the presence of catalysts, from carbohydrate materials and especially from corn sugar products.

We claim:

1. A process of making a caramel color solution from aqueous solutions of starch hydrolysis products of at least about 60% reducing sugar content calculated as dextrose comprising the steps of adding an alkaline reagent in such proportion as to produce a solution having a concentration of 0.1–5% of said alkaline reagent, heating the solution to 150°–250° F. for ¼ to 2 hours whereupon the specific rotation of the solution is decreased, thereafter adding an acid neutralizing agent to bring the hydrogen ion concentration within the range of pH 2.0 to pH 5.0 and caramelizing the solution at approximately 275°–380° F. until said solution has a tinctorial power of approximately 2–30 Lovibond units.

2. The process as set forth in claim 1 in which said reducing sugar products obtained by the hydrolysis of starch is a corn sugar having a gravity of 30 to 45° Bé.

3. The process as set forth in claim 1 in which the alkaline reagent is an alkali metal hydroxide.

References Cited in the file of this patent

UNITED STATES PATENTS

| 1,316,019 | Daniel | Sept. 16, 1919 |
| 2,354,664 | Cantor | Aug. 1, 1944 |
| 2,582,261 | Longenecker | Jan. 15, 1952 |
| 2,701,768 | Cleland | Feb. 8, 1955 |

FOREIGN PATENTS

| 463,954 | Canada | Mar. 28, 1950 |
| 88,178 | Switzerland | Feb. 16, 1921 |

OTHER REFERENCES

Clark: Jour. Inst. Brewing, July-August 1950, page 258.

Zerban: The Color Problem in Sucrose Manufacture, Tech. Report Series, No. 2, Sugar Res. Foundation Inc., N. Y., August 1947, pp. 3 and 4.

De Bruyn: Action of Alkalis on Sugars, II, pp. 156–163 and 203–215 of Recueil des Travaux Chemique des Pas Bas, vol. 14, 1895.